United States Patent [19]

Uchida et al.

[11] 4,214,826
[45] Jul. 29, 1980

[54] METHOD AND DEVICE FOR CONTROLLING THE EXPOSURE OF A CAMERA WHEN PHOTOGRAPHING AN OBJECT OF WHICH LUMINANCE IS DIFFERENT ON EACH SURFACE SECTION THEREOF

[75] Inventors: Yasuo Uchida; Kazuo Shiozawa; Kiziro Suzuki, all of Hachioji, Japan

[73] Assignee: Konishiroku Photo Industry Co., Ltd., Tokyo, Japan

[21] Appl. No.: 906,329

[22] Filed: May 4, 1978

Related U.S. Application Data

[63] Continuation of Ser. No. 706,070, Jul. 16, 1976.

[30] Foreign Application Priority Data

Jul. 21, 1975 [JP] Japan .................... 50-89484

[51] Int. Cl.² ............................................. G03B 7/08
[52] U.S. Cl. ....................................... 354/31; 356/222
[58] Field of Search ................... 354/24, 31; 356/222

[56] References Cited

U.S. PATENT DOCUMENTS

| 3,717,077 | 2/1973 | Harvey | 354/31 |
| 3,741,088 | 6/1977 | Nobusawa | 354/31 |
| 3,772,517 | 11/1973 | Smith | 354/31 |
| 3,945,732 | 3/1976 | Nobusawa | 354/31 |
| 3,971,046 | 7/1976 | Nobusawa | 354/31 |
| 3,994,595 | 11/1976 | Nobusawa | 354/31 |

FOREIGN PATENT DOCUMENTS 2229143 1/1974 Fed. Rep. of Germany ............. 354/31

*Primary Examiner*—L. T. Hix
*Assistant Examiner*—William B. Perkey
*Attorney, Agent, or Firm*—James E. Nilles

[57] ABSTRACT

A method of controlling the exposure of a camera comprising steps of measuring the luminance of an object on each surface section thereof by a plurality of photoelectric elements widely arranged on the image forming plane of the camera and where the light from the object to be photographed is received, of gaining the maximum and the minimum values of the outputs provided by any one of the photoelectric elements and detecting whether the difference between the maximum and the minimum values exceeds a predetermined value, and of converting the mode for determining the exposure by the detecting signal.

The exposure is determined on the basis of a luminance level equal to the maximum value when the difference between the maximum and the minimum values of the outputs provided by any one of the photoelectric elements exceeds the predetermined value and the number of the photoelectric elements providing outputs near the maximum value is small, while on the basis of a luminance level equal to the minimum value when the difference between the maximum and the minimum values of the outputs provided by any one of the photoelectric elements exceeds the predetermined value and the number of the photoelectric elements providing outputs near the minimum value is small.

2 Claims, 5 Drawing Figures

METHOD AND DEVICE FOR CONTROLLING THE EXPOSURE OF A CAMERA WHEN PHOTOGRAPHING AN OBJECT OF WHICH LUMINANCE IS DIFFERENT ON EACH SURFACE SECTION THEREOF

REFERENCE TO RELATED CO-PENDING APPLICATION

This application is a continuation of U.S. patent application Ser. No. 706,070, filed July 16, 1976.

The present invention relates to an improvement of the method of controlling the exposure of a camera.

In order to check the exposure accuracy attained by the exposure controlling system of a camera, there has been generally employed the method of measuring the light quantity exposed on an image forming plant at the time when the exposure is gained with the camera being opposed face to face to a plane on which the light projected is uniformly diffused. However, in practical photographing in which a variety of objects of which luminance is different on each surface section thereof is to be photographed, a correct exposure has not necessarily been obtained through the exposure controlling system which is adjusted in the conventional manner.

For example, in case the image forming plane is divided into nine same sections in each of which a small photoelectric element is arranged, and an object of which luminance is different on each section of the image forming plane, which difference is converted to a photometric value less than 2 EV, is to be photographed, a satisfactory result can be obtained by the exposure determining method using the photometric manner of giving weight to the center of the image forming plane. However, in case an object such as a person standing with the sun shining on his back, and the sun itself of which luminance is different on each section of the image forming plane, is to be which difference is converted to a photometric value more than 2 EV, it has been found that no correct exposure can be obtained by the conventional adjusting manner.

A variety of suggestions have been proposed to solve this problem. The most important thing to solve this problem is in what section of the image forming plane the photographer puts his theme and how he judges the exposure value suitable for his theme.

An object of the present invention is to solve this problem on the basis of a simple principle.

Other object of the present invention is to provide a new method of controlling the exposure of a camera when photographing an object of which luminance is different on each surface section thereof.

These and other objects as well as the merits of the present invention will be apparent from the following detailed description with reference to the accompanying drawings.

There will be now described the principle on which the present invention is based.

This principle is not purely theoretical but experimental and statistical, and has resulted from the practical photographing of various objects.

Figure 1:
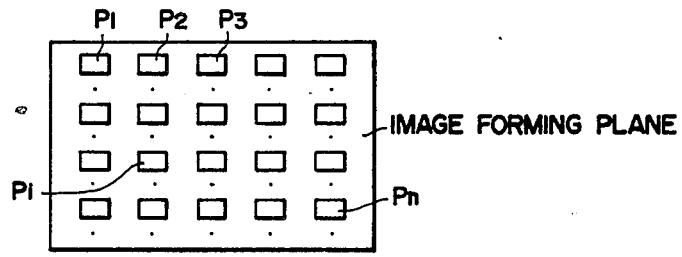
FIG. 1 is a view showing how a group of photoelectric elements are arranged.

Assume that small photoelectric elements consisting of a number n are arranged on the image forming plane as shown in FIG. 1 and that the outputs of the photoelectric elements are $P_1, P_2, P_3, \ldots P_n$. In case an object of which luminance is different on each surface section thereof is to be photographed, the relation between the outputs of the photoelectric elements can be expressed either by the following formula 1 or 2.

$$P_1 \approx P_2 \approx P_3 \ldots \approx P_n \gg P_i \ldots 1$$
$$P_1 \approx P_2 \approx P_3 \ldots \approx P_n \ll P_i \ldots 2$$

wherein $P_i$ represents an output greatly different from the one of each of the photoelectric elements.

Figure 2:
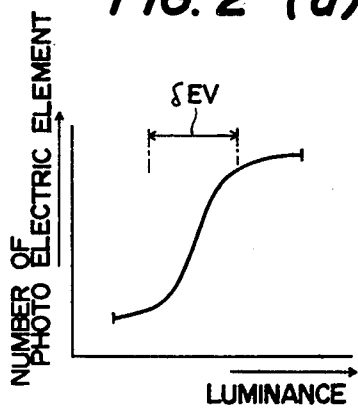
FIGS. 2a and 2b are curves showing the distribution of outputs of the photoelectric elements when photographing an object of which luminance is different on each surface secton thereof.
Figure 2:
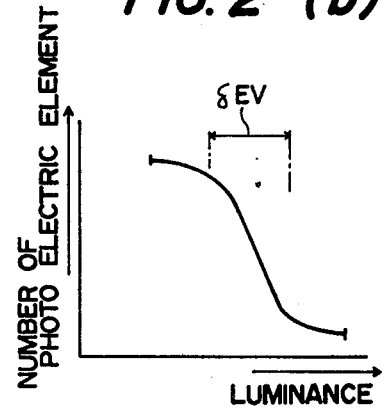

In this case, since it is not be limited to $P_i$ that has an output greatly different from each one of the photoelectric elements, depending on the number of the photoelectric elements, the arrangement of these photoelectric elements on the image forming plane, and the condition under which the object is held, it can be easily considered that the relation between the outputs of the photoelectric elements is shown as in FIGS. 2a and 2b, which are curves showing the distribution of outputs of the photoelectric elements when photographing an object of which luminance is different on each surface section thereof. FIG. 2a is a curve when the difference between the outputs of the photoelectric elements exceeds $\delta$ EV, that is, when the relation between the outputs of the photoelectric elements can be expressed by the formula 1, and FIG. 2b is a curve when the relation can be expressed by the formula 2.

Now let us assume that an object of which difference in its luminance on each surface section is normal and can be converted to a photometric value equal to $\delta$ EV is to be photographed. In case the relation between the outputs of the photoelectric elements can be expressed by the formula 1, it is considered that the object is a person on a skiing ground, a person standing by the window with the sun shining on his back, or an airplane flying in the blue sky. On the other hand, in case the relation can be expressed by the formula 2, it is considered that the object is a person in spotlight on a stage, a white flower with black background which is closed up, or the rising or setting sun itself. According to statistical results, it has been found in both cases of the formulas 1 and 2 except the case in which a special effect is aimed in the photographing, that the exposures mostly suitable for these photographing intentions can be gained by exposing the light at a level of $P_i$ or the one approximating $P_i$.

Figure 3:
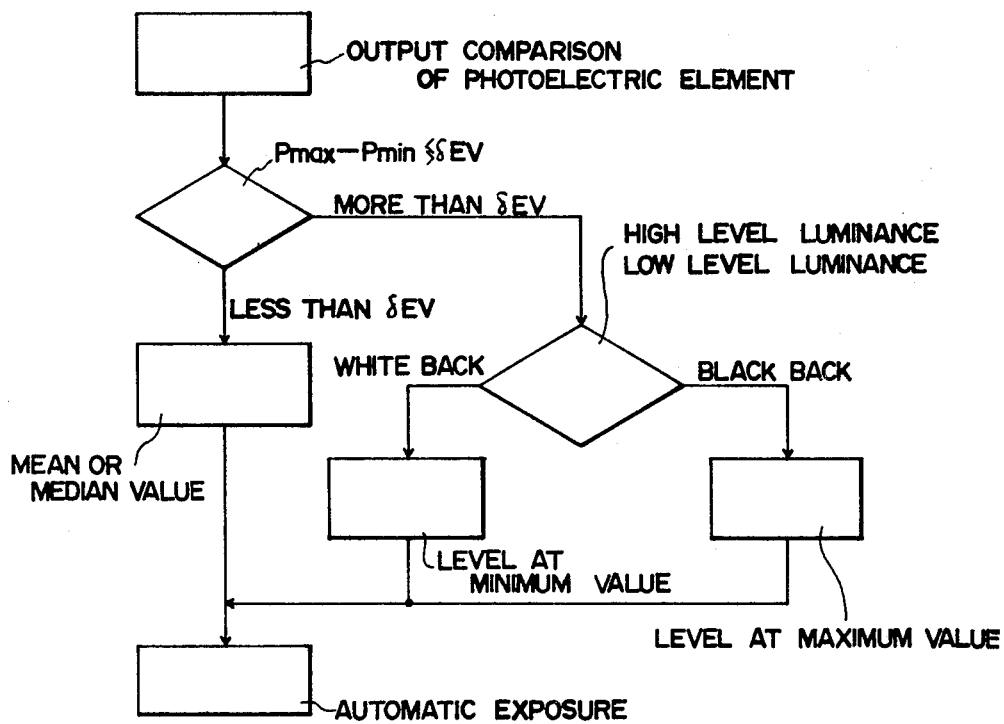
FIG. 3 is a block diagram according to the present invention.

The basic thought of the present invention lies in that the correct exposure relative to an object of which luminance is different on each surface section thereof can be attained by automatically finding the above-mentioned fact or phenomenon. FIG. 3 is a block diagram of the present invention.

Figure 4:
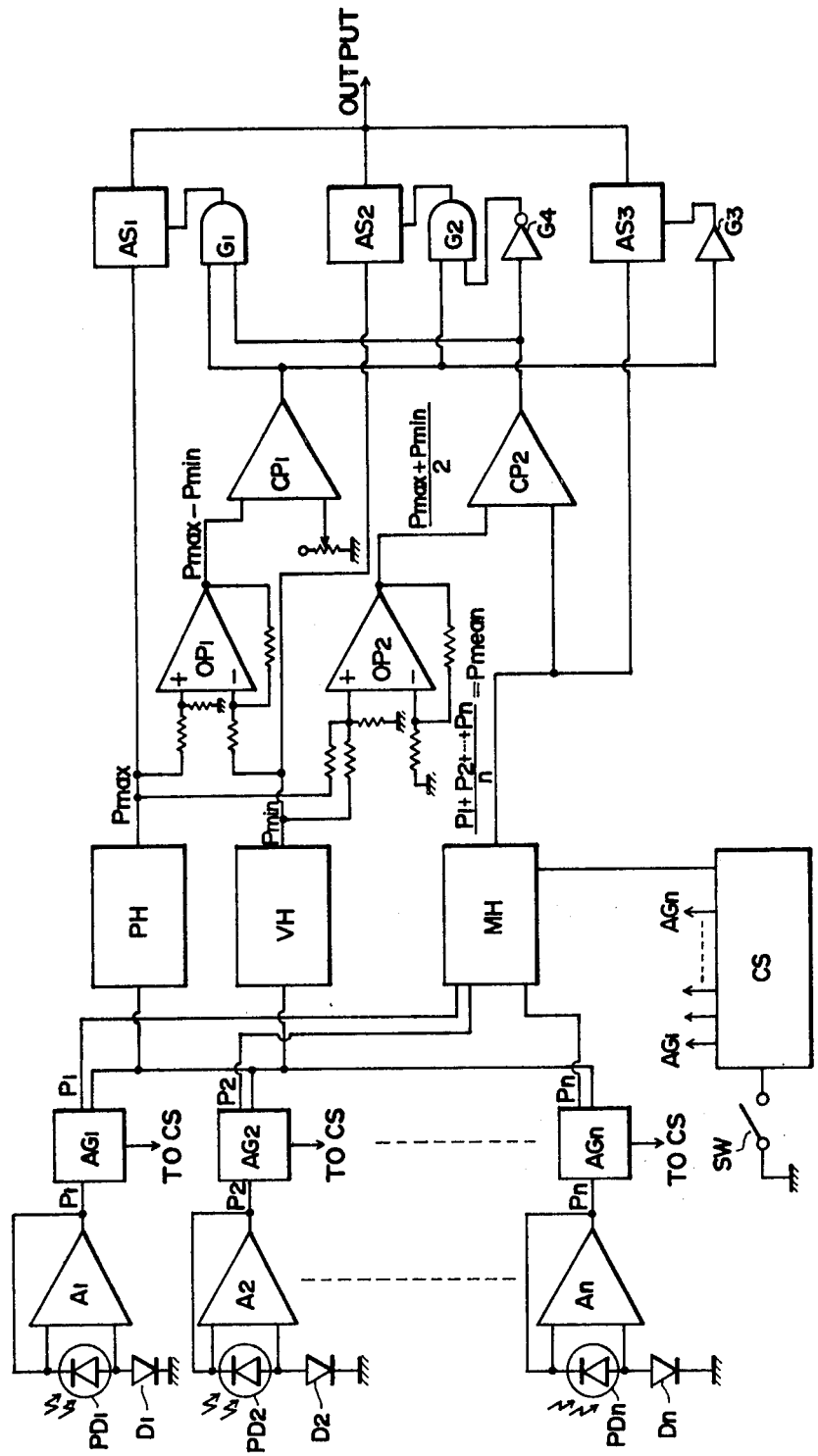
FIG. 4 is a circuit diagram showing an embodiment of the present invention.

FIG. 4 is a circuit diagram showing an embodiment of the present invention. In FIG. 4, $PD_1, PD_2, \ldots PD_n$ represent photodiodes arranged on the image forming plane of a camera or on a plane adjacent and parallel to the image forming plane, and the photocurrents of the photodiodes are logarithmically amplified by a logarithmic amplifier and converted to voltage $P_1, P_2, P_3, \ldots P_n$, said logarithmic amplifier comprising log diodes $D_1$, $D_2, \ldots D_n$ and operational amplifiers of high input impedance $A_1, A_2, \ldots A_n$.

SW represents a main switch interlocked with the shutter releasing operation and when this main switch is closed, a channel change-over circuit CS is brought into operation so as to close progressively and according to the time division analog switches $AG_1, AG_2, \ldots AG_n$ at the front stage. Therefore, the logarithmic voltages $P_1, P_2, \ldots P_n$ which are fed from the terminals of the analog switches are introduced into a circuit PH for detecting and holding the maximum output value and a circuit VH for detecting and holding the minimum output value, so that the maximum voltage P max and the minimum voltage P min may be detected and held by these circuits PH and VH.

When all of the analog switches $AG_1, AG_2, \ldots AG_n$ are closed through the channel change-over circuit CS, the outputs $P_1, P_2, \ldots P_n$ fed from the other terminals of the analog switches are introduced into a circuit MH for operating and holding the average value so that the average value P mean of the outputs $P_1, P_2, \ldots P_n$ may be operated and held by the circuit MH.

When the above-mentioned process is finished, the subtraction between the minimum and the maximum values (P max−P min) is accomplished by an operational amplifier $OP_1$, while the median between the maximum and the minimum values (P max+P min/2) is obtained by another operational amplifier $OP_2$. Then, the difference voltage resulted from the subtraction between the minimum and the maximum values (P max−P min) is compared with a predetermined voltage $\delta$ by a comparator $CP_1$ arranged at the subsequent stage, and it can be judged that P max−P min ≦ $\delta$, the object has not so large a difference in its luminance on each surface section thereof and that when P max−P min > $\delta$, the object has a large difference in its luminance on each surface section thereof.

For example, in the case of P max−P min ≦ $\delta$, the comparator $CP_1$ is kept in its "OFF" stage and an analog switch $AS_3$ at the back stage is closed by an inverter $G_3$ so that the average value operation and detecting circuit MH feeds an average value $(P_1+P_2+ \ldots +P_n)/n$ as an output. In the case of P max−P min > $\delta$, it is determined whether the background is white (the background has many bright portions) or black (the background has many dark portions), combining with the result obtained from the manner which will be described later, so that P max or P min or a value approximating P max or P min is fed, as an output, from the circuit MH.

In the latter case, it is determined whether the background is white or black in such a manner that the median (P max+P min)/2 and the average value P mean are compared with each other by another comparator $CP_2$. Namely, when the median is larger than the average value, it is determined that the background is black since the object has often dark portions overall, while when the average value is larger than the median it is determined that the background is white since the object has often bright portions overall.

In case both of the median and the average value are compared with each other to give a result P max+P min/2 ≧ P mean, the other comparator $CP_2$ is put "ON". If the comparator $CP_1$ is also in the state of P max−P min > $\delta$ and is kept "ON" at this time, an AND gate $G_1$ will be put "ON" and the analog switch $AS_1$ is closed to thereby feed P max as an output. On the contrary, in case the average value is larger than the median, the other comparator $CP_2$ is put "OFF". Since the OFF signal is inverted by an inverter $G_4$ at this time, an AND gate $G_2$ in put "ON" and an analog switch $AS_2$ is closed to thereby feed P min as an output.

These relations can be tabulated as set forth on the following.

| Conditions | $CP_1$ | $CP_2$ | AS | Output |
|---|---|---|---|---|
| P max − P min ≦ $\delta$ | 0 | 0 or 1 | $AS_3$,ON | P mean |
| P max − P min > $\delta$ $\frac{P max + P min}{2}$ ≧ P mean | 1 | 1 | $AS_1$,ON | P max |
| P max − P min > $\delta$ $\frac{P max + P min}{2}$ < P mean | 1 | 1 | $AS_2$,ON | P min |

These outputs themselves are used as information for the well-known electric shutter or for automatically controlling the diaphram.

As described above, the present invention can attain such a remarkable effect that the objects to be photographed, whether they may provide a normal or large difference in their luminance on each surface section thereof, are automatically judged to provide a correct exposure suitable for each of the objects. Though the pattern of an object is judged comparing the analog quantities in the embodiment as shown in the Figures, it may be carried out in the digital manner instead. When photographing an object of which the difference is normal in its quantity on each surface section thereof, it may be that the median or the average value between the outputs of the several photoelectric elements arranged near the center of the image forming plane is used instead of P mean. Further, when photographing an object of which the difference is large in its luminance of each surface section thereof, the outputs may be used in the form of P max±$\alpha$ or P min ±$\beta$, in place of the form of P max or P min.

We claim:

1. A method of controlling exposure of a camera comprising the steps of:
    measuring the luminance of a scene to be photographed by a plurality of photoelectric elements which are arranged on a substantially image-forming plane to receive light from respective portions of said scene;
    obtaining the maximum and minimum values of the outputs of said photoelectric elements;
    determining whether the difference between said maximum and minimum values is greater than a predetermined value or not;
    obtaining the mean value of the outputs of said photoelectric elements;
    and deriving information for exposure from said maximum, minimum and mean values so that said information is equivalent to said mean value when said difference is smaller than said predetermined value and so that said information is equivalent to either one of said maximum and minimum values when said difference is larger than said predetermined value.

2. A system for obtaining exposure information for a camera comprising:
    a plurality of photoelectric elements arranged to receive light from respective portions of a scene to be photographed;
    first means for obtaining the maximum value of the outputs from said photoelectric elements;

second means for obtaining the minimum value of the outputs from said photoelectric elements;

third means for obtaining the average value of the outputs from said photoelectric elements;

fourth means for obtaining the mean value of the maximum and minimum values;

first discriminating means for determining whether the difference between said maximum and minimum values is greater than a predetermined value or not, second discriminating means for determining whether said average value is greater than said mean value or not, and gate means connected to said first means, said second means, and said third means, said gate means being controlled by said first and said second discriminating means.

* * * * *